US012214902B2

(12) United States Patent
Infanti et al.

(10) Patent No.: US 12,214,902 B2
(45) Date of Patent: Feb. 4, 2025

(54) LANDING SYSTEMS AND METHODS FOR UNMANNED AERIAL VEHICLES

(71) Applicant: FLIR Unmanned Aerial Systems ULC, Vancouver (CA)

(72) Inventors: James Infanti, Waterloo (CA); Albert Pegg, New Dundee (CA); Tomi Kanninen, Waterloo (CA)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 100 days.

(21) Appl. No.: 17/966,559

(22) Filed: Oct. 14, 2022

(65) Prior Publication Data
US 2023/0140387 A1     May 4, 2023

Related U.S. Application Data

(60) Provisional application No. 63/273,126, filed on Oct. 28, 2021.

(51) Int. Cl.
*B64F 1/22*     (2024.01)
*B64C 25/62*     (2006.01)
(Continued)

(52) U.S. Cl.
CPC ............... *B64F 1/22* (2013.01); *B64C 25/62* (2013.01); *B64C 39/024* (2013.01);
(Continued)

(58) Field of Classification Search
CPC . B64F 1/22; B64F 1/007; B64C 25/62; B64C 39/024; G05D 1/0202; B64U 70/00;
(Continued)

(56) References Cited

U.S. PATENT DOCUMENTS

| 9,561,871 B2 | 2/2017 | Sugumaran |
| 9,592,908 B2 | 3/2017 | Gentry |

(Continued)

FOREIGN PATENT DOCUMENTS

| CN | 106628130 | 5/2017 |
| CN | 109 502 041 A | 3/2019 |

(Continued)

OTHER PUBLICATIONS

Galimov, Musa et al., "UAV Positioning Mechanisms in Landing Stations: Classification and Engineering Design Review", MDPI, Sensors, Jun. 29, 2020, pp. 1-31, Switzerland.

*Primary Examiner* — Medhat Badawi
(74) *Attorney, Agent, or Firm* — Haynes and Boone, LLP

(57) ABSTRACT

Systems and methods related to landing unmanned aerial vehicles (UAVs) are provided. In one example, a method includes receiving a UAV on a surface of a landing platform. The method may further include operating a positioning device disposed under the surface to locate the UAV. The method may further include operating the positioning device to move the UAV to a location and/or an orientation on the surface. The UAV may comprise landing gear having a plurality of legs, where each leg comprises a shock absorption system. The method may further include operating the shock absorption system during the receiving operation to reduce force received at stress areas of the UAV, and after the receiving operation, operating the shock absorption system to dampen movement by the UAV. Related devices and systems are also provided.

20 Claims, 10 Drawing Sheets

(51) Int. Cl.
  *B64C 39/02* (2023.01)
  *G05D 1/00* (2006.01)
  *B64U 70/00* (2023.01)
  *B64U 101/30* (2023.01)

(52) U.S. Cl.
  CPC ........... *G05D 1/0202* (2013.01); *B64U 70/00* (2023.01); *B64U 2101/30* (2023.01); *B64U 2201/20* (2023.01)

(58) Field of Classification Search
  CPC ............ B64U 2101/30; B64U 2201/20; B64U 60/50; B64U 70/99; B64U 80/10; B64U 80/25; B64U 70/97
  See application file for complete search history.

(56) References Cited

U.S. PATENT DOCUMENTS

| | | | | |
|---|---|---|---|---|
| 10,899,436 B2 * | 1/2021 | Gentry | ................... | B64U 60/40 |
| 11,597,515 B2 * | 3/2023 | Passley | ................... | B64U 50/35 |
| 11,603,218 B2 * | 3/2023 | Fisher | ................... | B64C 29/02 |
| 11,603,219 B2 * | 3/2023 | Ratajczak | ................ | B64D 1/22 |
| 11,636,771 B2 * | 4/2023 | Barker | ................... | B64C 39/024 |
| | | | | 701/16 |
| 11,667,402 B2 * | 6/2023 | Liske | ...................... | B64F 1/322 |
| | | | | 244/116 |
| 11,673,690 B2 * | 6/2023 | Dayan | ................... | B64U 10/60 |
| | | | | 244/114 R |
| 11,714,189 B2 * | 8/2023 | Padmanabhan | ..... | G01S 13/9027 |
| | | | | 342/22 |
| 11,738,867 B2 * | 8/2023 | Ehasoo | .................... | B60L 5/38 |
| | | | | 244/17.11 |
| 11,748,688 B2 * | 9/2023 | Ur | .......................... | B64C 39/024 |
| | | | | 705/332 |
| 11,760,485 B2 * | 9/2023 | Wabnegger | .......... | G01R 31/085 |
| | | | | 244/121 |
| 11,767,129 B2 * | 9/2023 | Warwick | ................. | B64F 1/007 |
| | | | | 244/137.1 |
| 11,772,814 B2 * | 10/2023 | Dubois | ................. | B64D 17/62 |
| | | | | 244/110 E |
| 11,780,606 B2 * | 10/2023 | Carthew | ................ | B64U 70/99 |
| | | | | 244/114 R |
| 11,794,894 B2 * | 10/2023 | Brock | .................... | B64U 70/95 |
| 11,814,191 B2 * | 11/2023 | Cheng | ..................... | B64F 1/36 |
| 11,814,241 B2 * | 11/2023 | Tian | ...................... | B65D 90/14 |
| 11,840,152 B2 * | 12/2023 | Fisher | ................. | G08G 5/0039 |
| 11,851,209 B2 * | 12/2023 | Fisher | ................... | B64C 39/024 |
| 11,858,662 B2 * | 1/2024 | Gil | .............................. | B64F 1/04 |
| 11,866,168 B2 * | 1/2024 | Cooper | ................... | B64F 1/222 |
| 11,884,422 B2 * | 1/2024 | Lowe | ................. | H05K 7/20154 |
| 11,897,630 B2 | 2/2024 | Rezvani et al. | | |
| 11,898,368 B2 * | 2/2024 | Blake | ........................ | E04H 6/44 |
| 11,900,823 B2 * | 2/2024 | Surace | ................. | G05D 1/0676 |
| 11,932,315 B2 * | 3/2024 | Hwang | ..................... | B64F 1/32 |
| 11,939,057 B2 * | 3/2024 | Hamm | ................... | B64F 50/38 |
| 11,939,080 B2 * | 3/2024 | Cowden | ................ | B64U 80/30 |
| 11,939,083 B2 * | 3/2024 | Baklycki | ................... | B64F 1/36 |
| 2014/0124621 A1 * | 5/2014 | Godzdanker | ............ | B64F 1/12 |
| | | | | 244/110 E |
| 2017/0038778 A1 | 2/2017 | Wang | | |
| 2017/0137118 A1 * | 5/2017 | Gentry | ................... | B64U 60/40 |
| 2019/0009926 A1 * | 1/2019 | Hu | ............................. | B64F 1/02 |
| 2019/0161190 A1 * | 5/2019 | Gil | ........................ | B64U 10/16 |
| 2020/0207484 A1 * | 7/2020 | Foggia | ..................... | B64F 1/36 |
| 2020/0346736 A1 * | 11/2020 | Krasnoff | ................... | B64C 3/56 |
| 2020/0346743 A1 * | 11/2020 | Bernard | ................ | B64U 60/50 |
| 2023/0140387 A1 * | 5/2023 | Infanti | ................... | B64C 25/62 |
| | | | | 244/114 R |

FOREIGN PATENT DOCUMENTS

| | | |
|---|---|---|
| CN | 208 915 429 U | 5/2019 |
| CN | 113 246 778 A | 8/2021 |
| KR | 2017 0039356 A | 4/2017 |
| WO | WO 2012/064891 A2 | 5/2012 |

\* cited by examiner

LANDING SYSTEMS AND METHODS FOR UNMANNED AERIAL VEHICLES

CROSS REFERENCE TO RELATED APPLICATIONS

This application claims priority to and the benefit of U.S. Provisional Patent Application No. 63/273,126 filed Oct. 28, 2021 and entitled "LANDING SYSTEMS AND METHODS FOR UNMANNED AERIAL VEHICLES," which is incorporated herein by reference in its entirety.

TECHNICAL FIELD

The present invention relates generally to unmanned aerial vehicles and, more particularly, to landing systems and methods for unmanned aerial vehicles.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and other untethered or tethered applications. In many cases, a UAV may be equipped with a variety of different elements, such as different types of sensors and navigation devices, and may be configured to address a broad variety of operational needs. In conducting various missions, a UAV may have to land and take-off. Landing and take-off for UAVs, especially autonomous UAVs, require accurate positioning between the UAV and the landing location. Even more accurate positioning may be required when the UAV needs to be aligned with a target location to be docked for battery charging or replacement, data exchange and processing, picking up or loading cargo, or movement into storage. Further complications in landing UAVs arise when considering stresses that a UAV must endure to safely land. Thus, there exists a need for highly accurate and robust landing systems and methods capable of precise positioning and safe fixation of the UAV at landing locations.

SUMMARY

In one or more embodiments, a method includes receiving a UAV on a surface of a landing platform. The method may further include operating a positioning device disposed under the surface to locate the UAV. The method may further include operating the positioning device to move the UAV to a location and/or an orientation on the surface. The UAV may comprise landing gear having a plurality of legs, where each leg comprises a shock absorption system, and the method may further include operating the shock absorption system during the receiving operation to reduce force received at stress areas of the UAV, and after the receiving operation to dampen movement by the UAV.

In one or more embodiments, a system includes a landing platform having a surface, a positioning device disposed under the surface and communicatively coupled to a logic device. The logic device may be configured to receive the UAV on the surface of the landing platform. The logic device may further be configured to operate the positioning device to locate the UAV. The logic device may further be configured to operate the positioning device to move the UAV to a location and/or orientation on the surface.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
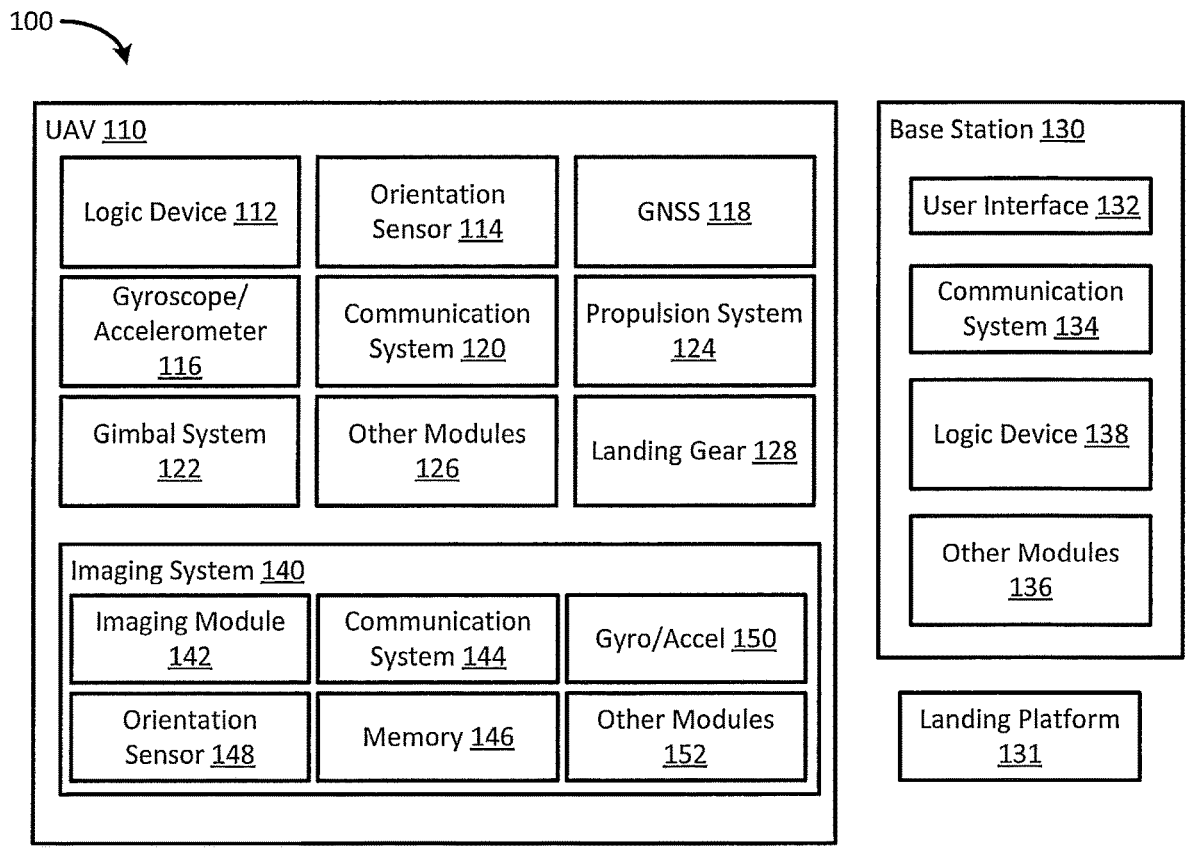
FIG. 1 illustrates a block diagram of a system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods related to landing operations for a UAV are provided by the present disclosure. One issue related to landing operations is UAV positioning. Positioning a UAV on a landing surface or platform after landing is desirable for a number of reasons including aligning to dock for battery charging or replacement and data exchange and processing, picking up or loading cargo, movement into a structure for storage, or proper positioning to await a next mission. Other issues related to landing operations include impact on landing and descent velocity, which are challenging to address due to changing environments in which a UAV operates. Oftentimes, an unmanaged landing impact and descent velocity may cause a UAV to experience conditions where landing stresses exceed what the UAV can tolerate, which may lead to permanent deformation of components or failures.

In some embodiments, a UAV is received on a surface of a landing platform. The landing platform may have a positioning device disposed under the surface and implemented with a magnetic mechanism. The positioning device may be operable to locate the UAV from under the surface and move the UAV to a target location and/or orientation on the landing platform surface using the magnetic mechanism. For example, the positioning device may have an electromagnet that may be selectively activated to attract the UAV (e.g., metal disposed on the UAV landing gear/feet/skid/ring) and moved below the surface to slide the UAV above the surface to the target location and/or orientation and may also fixedly secure the UAV once properly positioned (or the UAV may be secured through various other mechanisms as would be understood by one skilled in the art). In one embodiment, the positioning device may have a Hall effect sensor that is operable to detect the location of the UAV on the landing platform. In another embodiment, the landing platform surface may have a conical shape to passively guide the UAV to the target location where the positioning device can then orient the UAV to the target orientation.

In further embodiments, the UAV may have landing gear implemented with a shock absorption system. The shock absorption system may include a spring and/or other viscoelastic material configured to reduce the force received at stress areas of the UAV during a landing operation. The shock absorption system may include a shock absorber configured to dampen the movement by the UAV after the landing operation that may partially be due to the spring. In an embodiment, the shock absorption system may be implemented as a magnetorheological shock absorber. The positioning device of the landing platform may be able to attract the magnetorheological shock absorber to locate and/or move the UAV after it has landed on the landing platform and may also fixedly secure the UAV once properly positioned (or secured via other techniques as would be understood by one skilled in the art).

While reference is primarily made to UAVs herein, it will be appreciated that the systems and methods described in the present disclosure may generally be applied for other types of vehicles such as automobiles, bikes, boats, etc. Additional details and embodiments are described by reference to the accompanying figures below.

FIG. 1 illustrates a block diagram of a system 100 including a UAV 110 in accordance with one or more embodiments of the present disclosure. In various embodiments, the system 100 and/or elements of the system 100 may be configured to fly over a scene or survey area, to fly through a structure, or to approach a target and image or sense the scene, structure, or target, or portions thereof, using a gimbal system 122 to aim an imaging system/sensor payload 140 at the scene, structure, or target, or portions thereof, for example. Resulting imagery and/or other sensor data may be processed (e.g., by the sensor payload 140, UAV 110, and/or base station 130) and displayed to a user through use of a user interface 132 (e.g., one or more displays such as a multi-function display (MFD), a portable electronic device such as a tablet, laptop, or smart phone, or other appropriate interface) and/or stored in memory for later viewing and/or analysis. In some embodiments, the system 100 may be configured to use such imagery and/or sensor data to control operation of the UAV 110 and/or the sensor payload 140, as described herein, such as controlling the gimbal system 122 to aim the sensor payload 140 towards a particular direction, and/or controlling a propulsion system 124 to move the UAV 110 to a desired position in a scene or structure or relative to a target. In some cases, the imagery and/or sensor data may be used to detect light emitting devices or fiducial markers, such as AprilTag markers, associated with a target location and, in turn, land the UAV 110 at the target location or align the UAV 110 to interact with the target location, which may be on a landing platform 131.

In the embodiment shown in FIG. 1, the system 100 includes the UAV 110, a base station 130, at least one imaging system/sensor payload 140, and a landing platform 131. The UAV 110 may be implemented as a mobile platform configured to move or fly and position and/or aim the sensor payload 140 (e.g., relative to a designated or detected target). As shown in FIG. 1, the UAV 110 may include one or more of a logic device 112, an orientation sensor 114, a gyroscope/accelerometer 116, a global navigation satellite system (GNSS) 118, a communication system 120, a gimbal system 122, a propulsion system 124, and other modules 126. Operation of the UAV 110 may be substantially autonomous and/or partially or completely controlled by the base station 130, which may include one or more of the following: a user interface 132, a communications module 134, a logic device 138, and other modules 136. In other embodiments, the UAV 110 may include one or more of the elements of the base station 130, such as with various types of manned aircraft, terrestrial vehicles, and/or surface or subsurface watercraft. The sensor payload 140 may be physically coupled to the UAV 110 and be configured to capture sensor data (e.g., visible spectrum images, infrared images, narrow aperture radar data, and/or other sensor data) of a target position, area, and/or object(s) as selected and/or framed by operation of the UAV 110 and/or the base station 130. In some embodiments, one or more of the elements of the system 100 may be implemented in a combined housing or structure that can be coupled to or within the UAV 110 and/or held or carried by a user of the system 100.

The logic device 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of the UAV 110 and/or other elements of the system 100, such as the gimbal system 122, for example. Such software instructions may also implement methods for processing infrared images and/or other sensor signals, determining sensor information, providing user feedback (e.g., through the user interface 132), querying devices for operational parameters, selecting operational parameters for devices, or performing any of the various operations described herein (e.g., operations performed by logic devices of various elements of the system 100).

In addition, a non-transitory medium may be provided for storing machine readable instructions for loading into and execution by the logic device 112. In these and other embodiments, the logic device 112 may be implemented with other components where appropriate, such as volatile memory, non-volatile memory, one or more interfaces, and/or various analog and/or digital components for interfacing with devices of the system 100. For example, the logic device 112 may be adapted to store sensor signals, sensor information, parameters for coordinate frame transformations, calibration parameters, sets of calibration points, and/or other operational parameters, over time, for example, and provide such stored data to a user using the user interface 132. In some embodiments, the logic device 112 may be integrated with one or more other elements of the UAV 110, for example, or distributed as multiple logic devices within the UAV 110, base station 130, and/or sensor payload 140.

In some embodiments, the logic device 112 may be configured to substantially continuously monitor and/or store the status of and/or sensor data provided by one or more elements of the UAV 110, sensor payload 140, and/or base station 130, such as the position and/or orientation of the UAV 110, sensor payload 140, and/or base station 130, for example. In various embodiments, sensor data may be monitored and/or stored by the logic device 112 and/or processed or transmitted between elements of the system 100 substantially continuously throughout operation of the system 100, where such data includes various types of sensor data (e.g., for blinking pattern detection), control parameters, and/or other data.

The orientation sensor 114 may be implemented as one or more of a compass, float, accelerometer, and/or other device capable of measuring an orientation of the UAV 110 (e.g., magnitude and direction of roll, pitch, and/or yaw, relative to one or more reference orientations such as gravity and/or Magnetic North), gimbal system 122, imaging system/sensor payload 140, and/or other elements of system 100, and providing such measurements as sensor signals and/or data that may be communicated to various devices of the system 100. In some cases, a yaw and/or position of the UAV 110 may be adjusted to better position/orient the UAV 110 to align with a target location based on a fiduciary marker associated with the target location. The gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of the UAV 110 and/or other elements of the system 100 and providing such measurements as sensor signals and/or data that may be communicated to other devices of the system 100 (e.g., user interface 132, logic device 112, logic device 138). The GNSS 118 may be implemented according to any global navigation satellite system, including a GPS, GLONASS, and/or Galileo based receiver and/or other device capable of determining absolute and/or relative position of the UAV 110 (e.g., or an element of the UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of the system 100. In some embodiments, the GNSS 118 may include an altimeter, for example, or may be used to provide an absolute altitude.

The communication system 120 may be implemented as any wired and/or wireless communications module configured to transmit and receive analog and/or digital signals between elements of the system 100. For example, the communication system 120 may be configured to receive flight control signals and/or data from the base station 130 and provide them to the logic device 112 and/or propulsion system 124. In other embodiments, the communication system 120 may be configured to receive images and/or other sensor information (e.g., visible spectrum and/or infrared still images or video images) from the sensor payload 140 and relay the sensor data to the logic device 112 and/or base station 130. In some embodiments, the communication system 120 may be configured to support spread spectrum transmissions, for example, and/or multiple simultaneous communications channels between elements of the system 100. Wireless communication links may include one or more analog and/or digital radio communication links, such as WiFi and others, as described herein, and may be direct communication links established between elements of the system 100, for example, or may be relayed through one or more wireless relay stations configured to receive and retransmit wireless communications. Communication links established by the communication system 120 may be configured to transmit data between elements of the system 100 substantially continuously throughout operation of the system 100, where such data includes various types of sensor data, control parameters, and/or other data.

The gimbal system 122 may be implemented as an actuated gimbal mount, for example, that may be controlled by the logic device 112 to stabilize the sensor payload 140 relative to a target (e.g., a target location) or to aim the sensor payload 140 or components coupled thereto according to a desired direction and/or relative orientation or position. As such, the gimbal system 122 may be configured to provide a relative orientation of the sensor payload 140 (e.g., relative to an orientation of the UAV 110) to the logic device 112 and/or communication system 120 (e.g., gimbal system 122 may include its own orientation sensor 114). In other embodiments, the gimbal system 122 may be implemented as a gravity driven mount (e.g., non-actuated). In various embodiments, the gimbal system 122 may be configured to provide power, support wired communications, and/or otherwise facilitate operation of articulated the sensor/sensor payload 140. In further embodiments, the gimbal system 122 may be configured to couple to a laser pointer, range finder, and/or other device, for example, to support, stabilize, power, and/or aim multiple devices (e.g., the sensor payload 140 and one or more other devices) substantially simultaneously.

In some embodiments, the gimbal system 122 may be adapted to rotate the sensor payload 140±90 degrees, or up to 360 degrees, in a vertical plane relative to an orientation and/or position of the UAV 110. In further embodiments, the gimbal system 122 may rotate the sensor payload 140 to be parallel to a longitudinal axis or a lateral axis of the UAV 110 as the UAV 110 yaws, which may provide 360 degree ranging and/or imaging in a horizontal plane relative to UAV 110. In various embodiments, logic device 112 may be configured to monitor an orientation of gimbal system 122 and/or sensor payload 140 relative to UAV 110, for example, or an absolute or relative orientation of an element of sensor payload 140. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to the UAV 110 and/or to steer the UAV 110. In some embodiments, the propulsion system 124 may include multiple propellers (e.g., a tri, quad, hex, oct, or other type "copter") that can be controlled (e.g., by the logic device 112 and/or the logic device 138) to provide lift and motion for the UAV 110 and to provide an orientation for UAV 110. In other embodiments, the propulsion system 124 may be configured primarily to provide thrust while other structures of the UAV 110 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Other modules 126 may include other and/or additional sensors, actuators, communications modules/nodes, and/or user interface devices, for example, and may be used to provide additional environmental information related to operation of the UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of the system 100 (e.g., logic device 112) to provide operational control of the UAV 110 and/or the system 100.

In some embodiments, other modules 126 may include one or more actuated and/or articulated devices (e.g., light emitting devices (e.g., light emitting diodes), multi-spectrum active illuminators, visible and/or IR cameras, radars, sonars, and/or other actuated devices) coupled to the UAV 110, where each actuated device includes one or more actuators adapted to adjust an orientation of the device, relative to the UAV 110, in response to one or more control signals (e.g., provided by the logic device 112). In particular, other modules 126 may include a stereo vision system configured to provide image data that may be used to calculate or estimate a position of the UAV 110, for example, or to calculate or estimate a relative position of a navigational hazard in proximity to the UAV 110. In various embodiments, the logic device 112 may be configured to use such proximity and/or position information to help safely pilot the UAV 110 and/or monitor communication link quality, as described herein.

The landing gear 128 may be implemented according to various embodiments. The landing gear 128 may provide the principal support of the UAV 110 during landing, enable the UAV 110 to land on a landing platform or ground/terrain and keep other areas of the UAV above a landing surface, and absorb the landing impact energy so as to minimize the loads transmitted to a frame/body of the UAV 110 including any of the sensor components of the UAV 110. In some embodiments, the landing gear 128 may be located at ends of propulsion system extension arms or under the center of rest of the UAV 110 (e.g., the body). The landing gear 128 may include various components including a shock absorber system (e.g., spring, shock absorber), legs, wheels, a brake system, a turning system, an undercarriage retractile system, etc. In some embodiments, the landing gear 128 may include a magnet (e.g., an electromagnet) or metal that may be used as described herein in conjunction with the landing platform 131 to locate and/or move the UAV 110 about the landing platform 131 to a target position and/or orientation and may further secure the UAV to the landing platform (or the UAV may be secured by various other techniques as would be known by one skilled in the art). In some cases, the landing gear 128 may include a plurality of legs, where each leg has a corresponding shock absorber system that can be operated during and after a landing of the UAV 110 to reduce force received at stress areas of the UAV 110. The shock absorption system may further dampen movement by the UAV 110 after the landing. The shock absorption system may include a spring and/or other visco-elastic material to reduce the force at the stress areas and a shock absorber configured to dampen the movement caused by the spring and/or other visco-elastic material. The spring may be configured to bias two portions of a corresponding leg according to some implementations. In some embodiments, the shock absorber may include a magnetorheological shock absorber, where the magnetorheological shock absorber may be attracted by a positioning device of the landing platform 131 to locate and/or move the UAV 110.

The landing platform 131 of the system 100 may be configured to receive the UAV 110 on a surface of the landing platform 131. The landing platform 131 may include a positioning device disposed under the surface of the landing platform 131, where the positioning device may be operated to locate the UAV 110 and move the UAV 110 to a location and/or orientation of the surface. For example, the positioning device may be operated to translate the UAV 110 to the location on the surface and/or rotate the UAV 110 to the orientation on the surface. The landing platform 131 may further include at least one Hall effect sensor, which may be implemented in the positioning device. The Hall effect sensor may be used to detect a magnet or other component disposed on the UAV 110 (e.g., the landing gear 128 or components thereof).

The user interface 132 of the base station 130 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 132 may be adapted to provide user input (e.g., as a type of signal and/or sensor information transmitted by the communication system 134 of the base station 130) to other devices of the system 100, such as the logic device 112. The user interface 132 may also be implemented with logic device 138 (e.g., similar to logic device 112), which may be adapted to store and/or execute instructions, such as software instructions, implementing any of the various processes and/or methods described herein. For example, the user interface 132 may be adapted to form communication links and transmit and/or receive communications (e.g., infrared images and/or other sensor signals, control signals, sensor information, user input, and/or other information), for example, or to perform various other processes and/or methods described herein (e.g., via logic device 138).

In one embodiment, the user interface 132 may be adapted to display a time series of various sensor information and/or other parameters as part of or overlaid on a graph or map, which may be referenced to a position and/or orientation of the UAV 110 and/or other elements of the system 100. For example, the user interface 132 may be adapted to display a time series of positions, headings, and/or orientations of the UAV 110 and/or other elements of the system 100 overlaid on a geographical map, which may include one or more graphs indicating a corresponding time series of actuator control signals, sensor information, and/or other sensor and/or control signals.

In some embodiments, the user interface 132 may be adapted to accept user input including a user-defined target heading, waypoint, route, and/or orientation for an element of the system 100, for example, and to generate control signals to cause the UAV 110 to move according to the target heading, route, and/or orientation, or to aim the sensor payload 140 accordingly. In other embodiments, the user interface 132 may be adapted to accept user input modifying a control loop parameter of the logic device 112, for example. In further embodiments, the user interface 132 may be adapted to accept user input including a user-defined target attitude, orientation, and/or position for an actuated or articulated device (e.g., the sensor payload 140) associated with the UAV 110, for example, and to generate control signals for adjusting an orientation and/or position of the actuated device according to the target altitude, orientation, and/or position. Such control signals may be transmitted to the logic device 112 (e.g., using the communication system 134 and 120), which may then control the UAV 110 accordingly.

The communication system 134 may be implemented as any wired and/or wireless communications module configured to transmit and receive analog and/or digital signals between elements of the system 100. For example, the communication system 134 may be configured to transmit flight control signals from the user interface 132 to communication system 120 or 144. In other embodiments, the communication system 134 may be configured to receive sensor data (e.g., visible spectrum and/or infrared still images or video images, or other sensor data) from the sensor payload 140. In some embodiments, the communication system 134 may be configured to support spread spectrum transmissions, for example, and/or multiple simultaneous communications channels between elements of the system 100. In various embodiments, the communication system 134 may be configured to monitor the status of a communication link established between the base station 130, the sensor payload 140, and/or the UAV 110 (e.g., including packet loss of transmitted and received data between elements of the system 100, such as with digital communication links), as described herein. Such status information may be provided to the user interface 132, for example, or transmitted to other elements of the system 100 for monitoring, storage, or further processing.

Other modules 136 of the base station 130 may include other and/or additional sensors, actuators, communications modules/nodes, and/or user interface devices used to provide additional environmental information associated with the base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of the system 100 (e.g., logic device 112) to provide operational control of the UAV 110 and/or system 100 or to process sensor data to compensate for environmental conditions, such as an water content in the atmosphere approximately at the same altitude and/or within the same area as the UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 132).

In embodiments where the imaging system/sensor payload 140 is implemented as an imaging device, the imaging system/sensor payload 140 may include an imaging module 142, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 142 may include one or more logic devices (e.g., similar to the logic device 112) that can be configured to process imagery captured by detector elements of the imaging module 142 before providing the imagery to memory 146 or the communication system 144. More generally, the imaging module 142 may be configured to perform any of the operations or methods described herein, at least in part, or in combination with the logic device 112 and/or user interface 132.

In some embodiments, the sensor payload 140 may be implemented with a second or additional imaging modules similar to the imaging module 142, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 142 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 144 of the sensor payload 140 may be implemented as any wired and/or wireless communications module configured to transmit and receive analog and/or digital signals between elements of the system 100. For example, the communication system 144 may be configured to transmit infrared images from the imaging module 142 to communication system 120 or 134. In other embodiments, the communication system 144 may be configured to receive control signals (e.g., control signals directing capture, focus, selective filtering, and/or other operation of sensor payload 140) from the logic device 112 and/or user interface 132. In some embodiments, communication system 144 may be configured to support spread spectrum transmissions, for example, and/or multiple simultaneous communications channels between elements of the system 100. In various embodiments, the communication system 144 may be configured to monitor and communicate the status of an orientation of the sensor payload 140 as described herein. Such status information may be provided or transmitted to other elements of the system 100 for monitoring, storage, or further processing.

The memory 146 may be implemented as one or more machine readable mediums and/or logic devices configured to store software instructions, sensor signals, control signals, operational parameters, calibration parameters, infrared images, and/or other data facilitating operation of the system 100, for example, and provide it to various elements of the system 100. The memory 146 may also be implemented, at least in part, as removable memory, such as a secure digital memory card for example including an interface for such memory.

An orientation sensor 148 of the sensor payload 140 may be implemented similar to the orientation sensor 114 or gyroscope/accelerometer 116, and/or any other device capable of measuring an orientation of the sensor payload 140, the imaging module 142, and/or other elements of the sensor payload 140 (e.g., magnitude and direction of roll, pitch, and/or yaw, relative to one or more reference orientations such as gravity, Magnetic North, and/or an orientation of the UAV 110) and providing such measurements as sensor signals that may be communicated to various devices of the system 100. A gyroscope/accelerometer (e.g., angular motion sensor) 150 of the sensor payload 140 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 140 and/or various elements of the sensor payload 140 and providing such measurements as sensor signals that may be communicated to various devices of the system 100.

Other modules 152 of the sensor payload 140 may include other and/or additional sensors, actuators, communications modules/nodes, cooled or uncooled optical filters, and/or user interface devices used to provide additional environmental information associated with the sensor payload 140, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 142 or other devices of the system 100 (e.g., logic device 112) to provide operational control of the UAV 110 and/or system 100 or to process imagery to compensate for environmental conditions.

In general, each of the elements of the system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of the system 100. In addition, one or more non-transitory mediums may be provided for storing machine readable instructions for loading into and execution by any logic device implemented with one or more of the devices of the system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of the system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of the system 100 may include one or more modules supporting wired, wireless, and/or a combination of wired and wireless communication techniques. In some embodiments, various elements or portions of elements of the system 100 may be integrated with each other, for example, or may be integrated onto a single printed circuit board (PCB) to reduce system complexity, manufacturing costs, power requirements, coordinate frame errors, and/or timing errors between the various sensor measurements. Each element of the system 100 may include one or more batteries, capacitors, or other electrical power storage devices, for example, and may include one or more solar cell modules or other electrical power generating devices. In some embodiments, one or more of the devices may be powered by a power source for the UAV 110, using one or more power leads. Such power leads may also be used to support one or more communication techniques between elements of the system 100.

Figure 2:
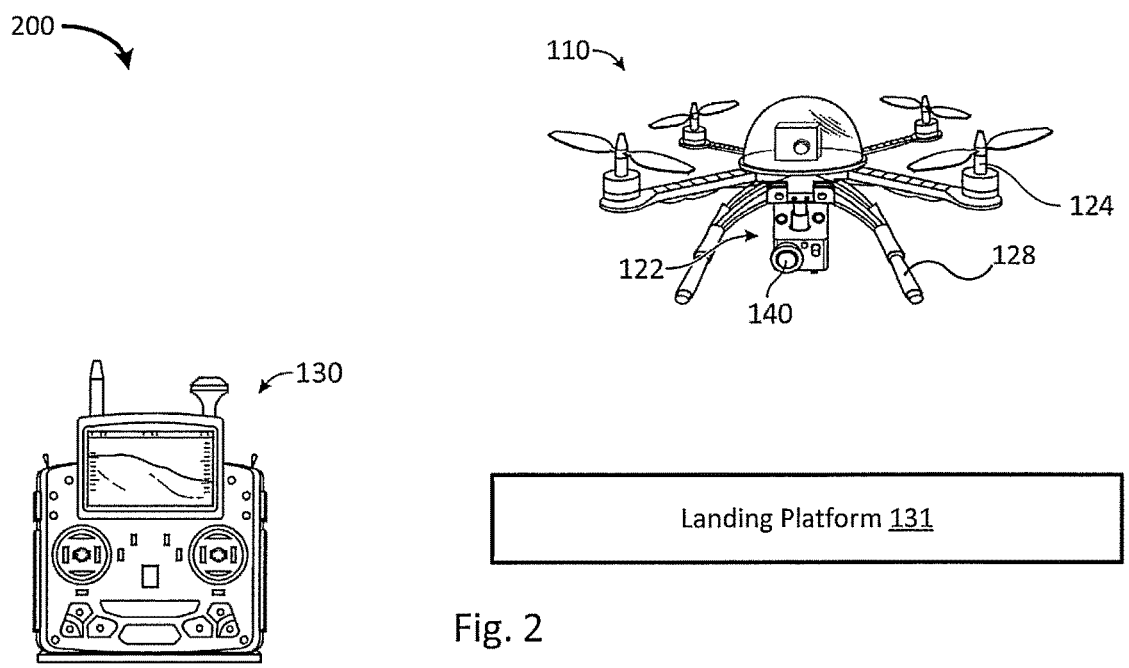
FIG. 2 illustrates a diagram of a system in accordance with one or more embodiments of the present disclosure.

FIG. 2 illustrates a diagram of a system 200 in accordance with one or more embodiments of the present disclosure. In the embodiment shown in FIG. 2, the system 200 includes a base station 130, a UAV 110, and a landing platform 131. In some embodiments, the base station 130 may be configured to control motion, position, and/or orientation of the UAV 110 and/or sensor payloads 140. Further, the base station 130 may be configured to control operation of the landing platform 131 in some embodiments. In various embodiments, the UAV 110 may be configured to control an operation of the landing platform 131 such that the UAV 110 may automate a landing procedure as discussed herein. Generally, the system 200 may include any number of UAVs, landing platforms, and base stations.

Figure 3:
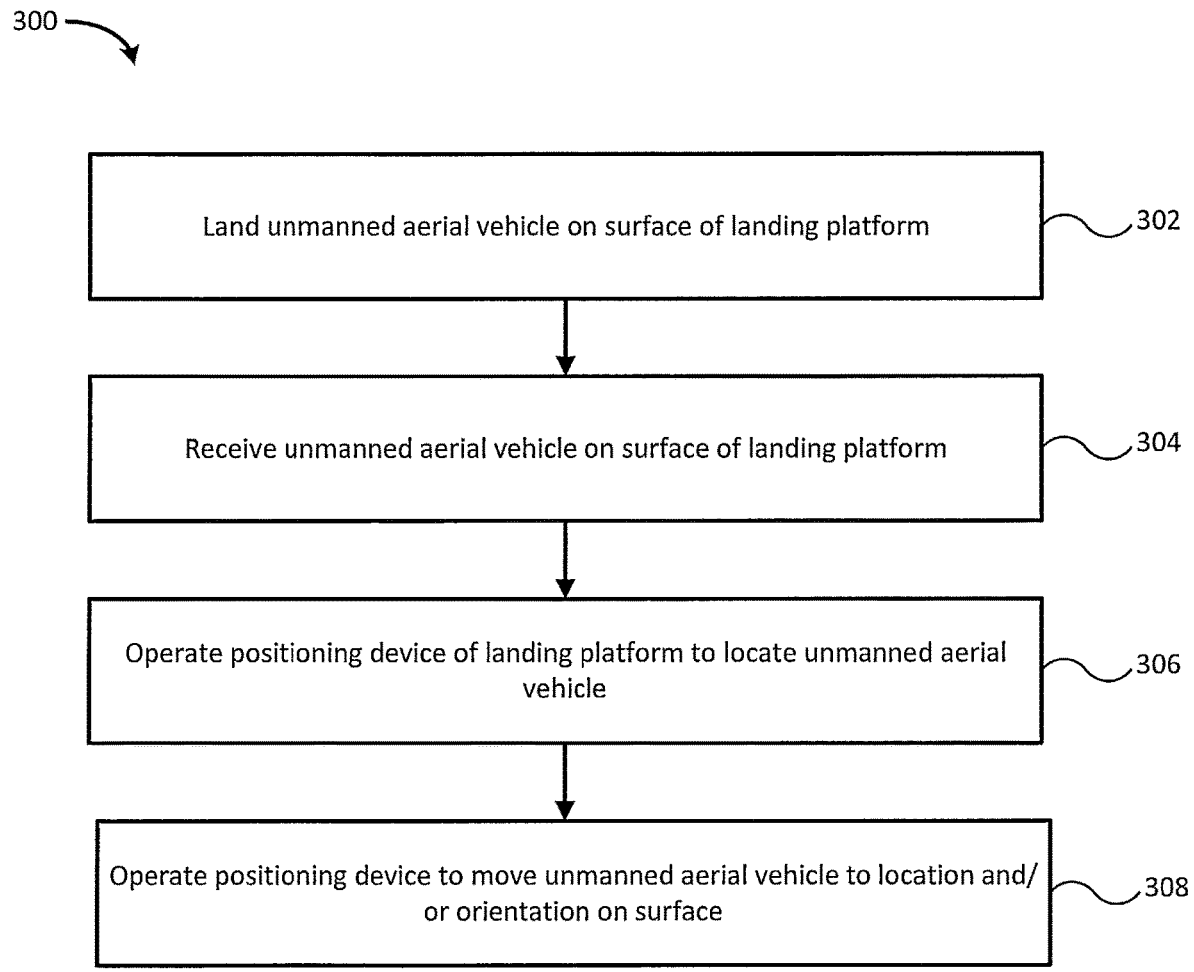
FIG. 3 illustrates a flow diagram of a process for positioning a UAV on a landing platform in accordance with one or more embodiments of the present disclosure.

FIG. 3 illustrates a flow diagram of an example process 300 for positioning a UAV on a landing platform in accordance with one or more embodiments of the present disclosure. For explanatory purposes, the process 300 is described with reference to FIGS. 4-9. Note that one or more operations in FIG. 3 may be combined, omitted, and/or performed in a different order as desired. According to various embodiments, the process 300 may be performed by a logic device, such as the logic device 112 of the UAV 110, a logic device for a landing platform 131, the logic device 138 for the base station 130, or a combination of the aforementioned logic devices, which may be communicatively coupled to execute the operations of process 300.

Figure 4:
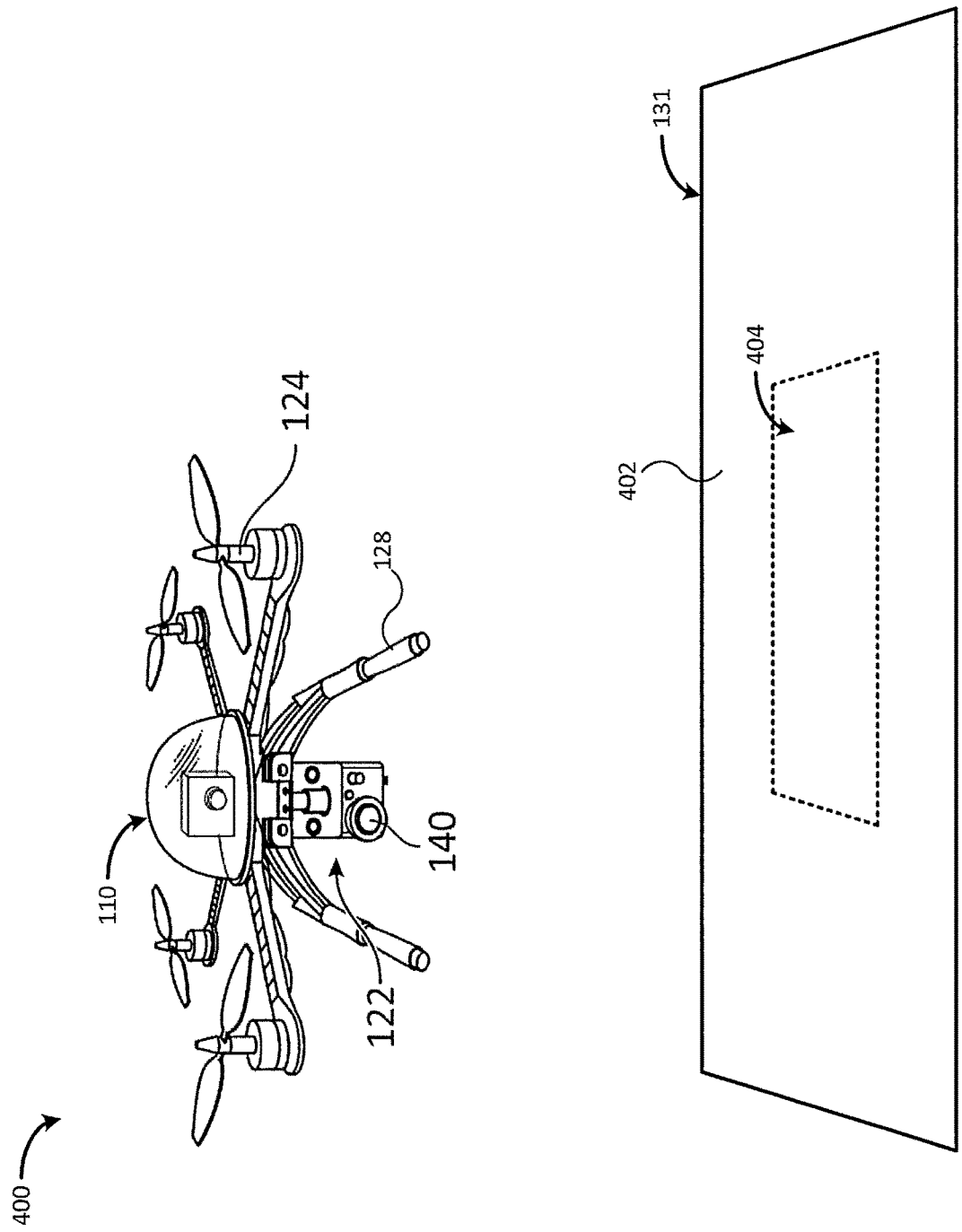
FIG. 4 illustrates a diagram of a UAV approaching a landing platform for landing in accordance with one or more embodiments of the present disclosure.
Figure 5:
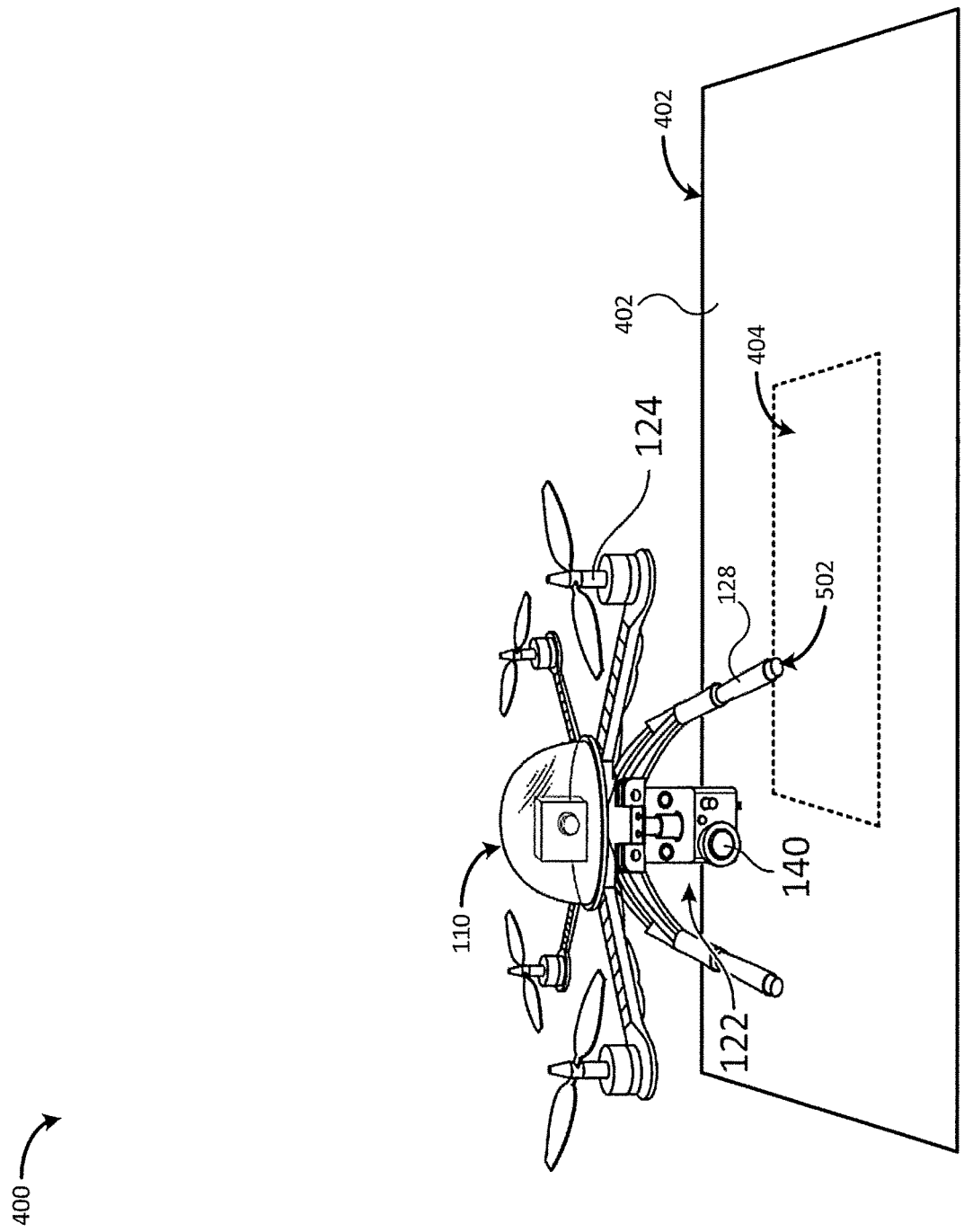
FIG. 5 illustrates a diagram of a UAV that has landed on a landing platform in accordance with one or more embodiments of the present disclosure.

At block 302 of process 300, and in reference to an environment 400 of FIG. 4, a logic device may operate the UAV 110 to land the UAV 110 on a surface 402 of the landing platform 131. In some embodiments, the imaging system 140 may capture images of a target location on the surface 402 to land the UAV 110 on the landing platform 131. For example, the imaging system 140 may capture images of the surface 402 from certain distances away as the UAV 110 approaches the landing platform 131, where the images may be used to guide the UAV 110 to the target location on the surface 402 of the landing platform 131. In some embodiments, the surface 402 may include fiduciary markers such as AprilTags or light emitting device patterns, which may be used to guide the UAV 110 toward a target location on the surface 402. The logic device may communicate with imaging system 140 to capture and process said images according to some embodiments.

In various embodiments, the landing platform 131 may be where the UAV 110 is parked for movement into storage or docked for power (e.g., battery charging) or data exchange. In cases where the UAV 110 needs to be aligned, such as for battery charging or data exchange, the UAV 110 may need to be precisely aligned on the landing platform 131 in a target location and/or orientation such that a wired or wireless interface may connect the UAV 110 to an electronic system associated with the landing platform 131. The electronic system associated with the landing platform 131 may be configured to provide power to the UAV 110 and/or exchange data with the UAV 110.

At block 304 of process 300, the landing platform 131 may receive the UAV 110 on the surface 402 of the landing platform 131. However, the UAV 110 may not have landed on the surface 402 at the target location and/or in the target orientation. For example, in reference to diagram 802 of FIG. 8, a UAV's landing position, as denoted by the solid-line ABCD pattern, may be offset from the target location and target orientation denoted by the dashed-line ABCD pattern.

In some embodiments, the logic device may detect that the UAV 110 did not land in the target location or orientation. For example, the UAV 110 may communicate to the landing platform 131 that the UAV 110 has landed, but a positioning device 404 located under the surface 402 of the landing platform 131 may be used to determine that the UAV 110 is not at the target location and orientation denoted by the dash-line ABCD pattern. In some embodiments, the UAV 110 may be able to determine that it has not precisely landed on the surface 402, such as through imagery of fiduciary markers on the landing platform 131, and may request the landing platform 131 to make any needed corrections to move the UAV 110 to the target location and/or orientation. In this regard, in some embodiments, the UAV 110 may make a rough landing while the landing platform 131 may be used to make fine adjustments to the location and orientation of the UAV 110 to place the UAV 110 in a target location and/or orientation and may further secure the UAV 110 to the landing platform 131 once properly positioned.

At block 306 of process 300, the logic device may operate the positioning device 404 to locate the UAV 110. In various embodiment, the positioning device 404 may be disposed under the surface 402 of the landing platform 131 such that the positioning device 404 is able to make detections through the surface 402. Thus, the positioning device 404 may be disposed sufficiently near or touching an underside of the surface 402 opposite of the UAV 110, such that the positioning device 404 may move about the underside of the surface 402 to locate the UAV 110.

Figure 6:
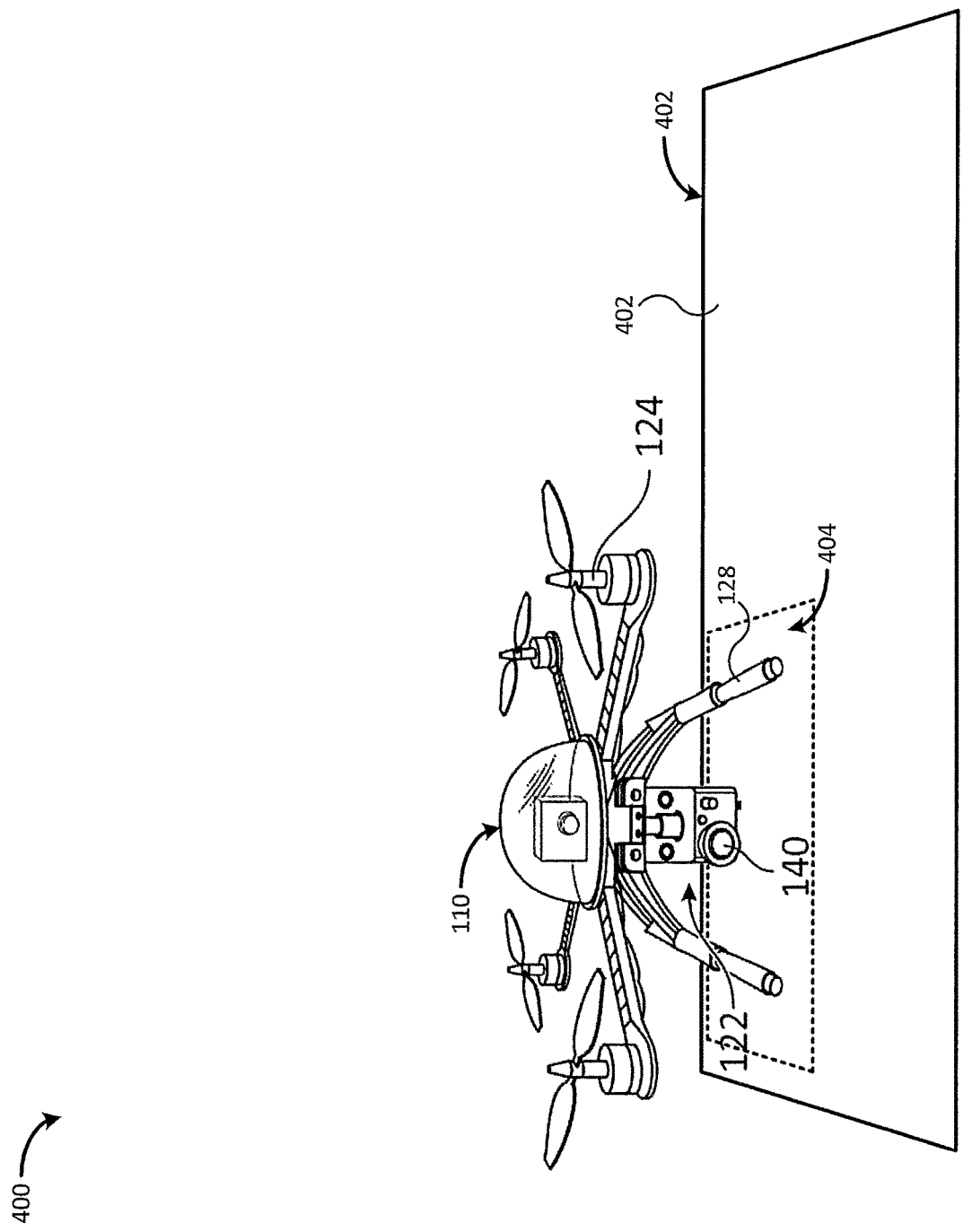
FIG. 6 illustrates a diagram of a positioning device that has located a UAV that has landed on a landing platform in accordance with one or more embodiments of the present disclosure.
Figure 7:
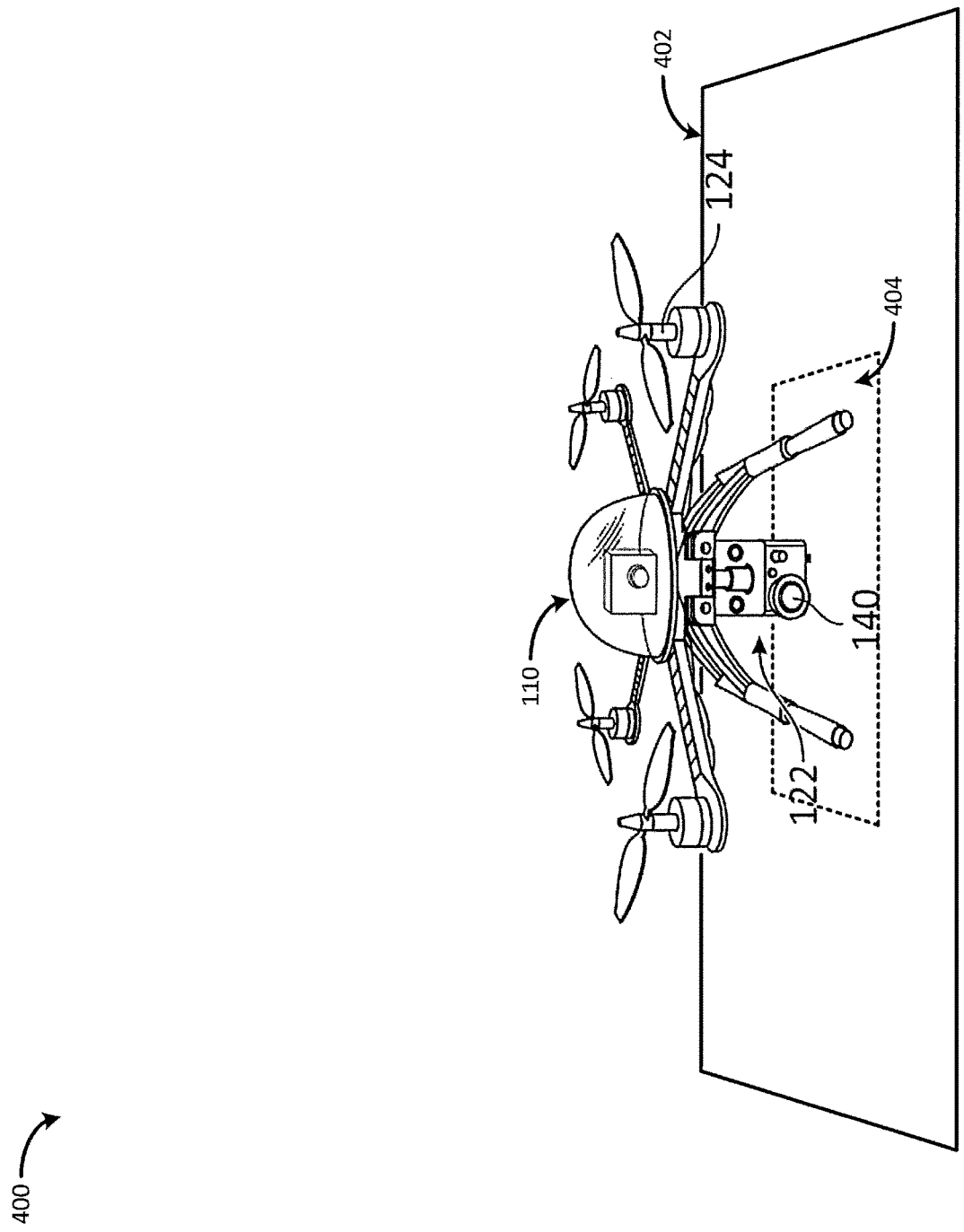
FIG. 7 illustrates a diagram of a UAV that has been moved to a target location and orientation on a landing platform in accordance with one or more embodiments of the present disclosure.

In some embodiments, the positioning device 404 may include one or more Hall effect sensors configured to interact with components (e.g., magnet, electromagnet) disposed in the landing gear 128 of the UAV 110. The logic device may locate the UAV 110 by moving the positioning device 404, such as in a predefined pattern under the surface 402 and detecting an interaction between the Hall effect sensor(s) and the component(s) of the landing gear 128. For example, in reference to FIG. 5, the positioning device 404 may locate the UAV 110 by detecting a magnet 502 disposed on the landing gear 128 of the UAV 110. The positioning device 404 may be operated to continue locating each magnet of the remaining legs of the landing gear 128 until each leg has been found and the positioning device 404 is in a position under the surface 402 suitable to move the UAV 110 (e.g., underneath the UAV 110) as shown in FIG. 6 and may further for an embodiment be used to secure the UAV 110 in a fixed position once properly positioned.

Figure 8:
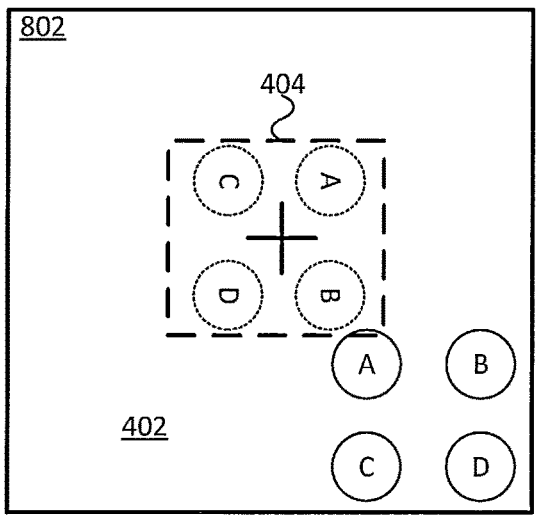
FIG. 8 illustrates diagrams showing a top view of a UAV (transparent) that has landed on a landing platform, is located using a positioning device, and is moved to a target location and orientation on the landing platform in accordance with one or more embodiments of the present disclosure.
Figure 8:
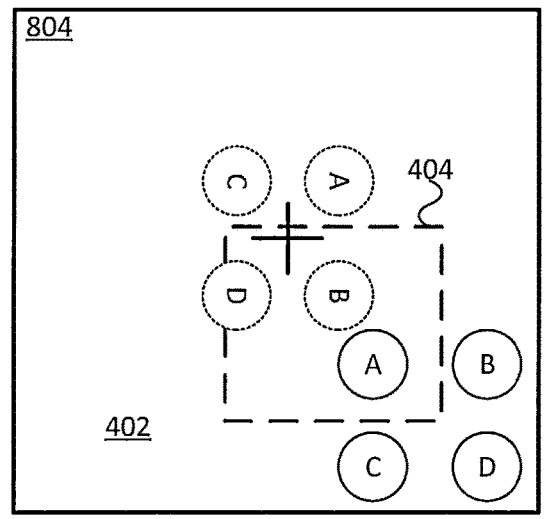
Figure 8:
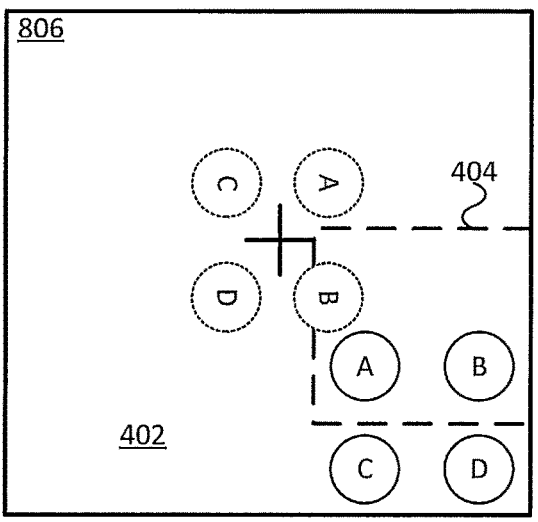
Figure 8:
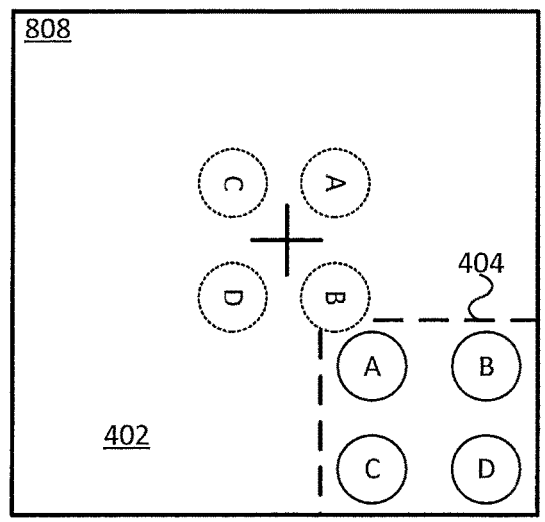
Figure 8:
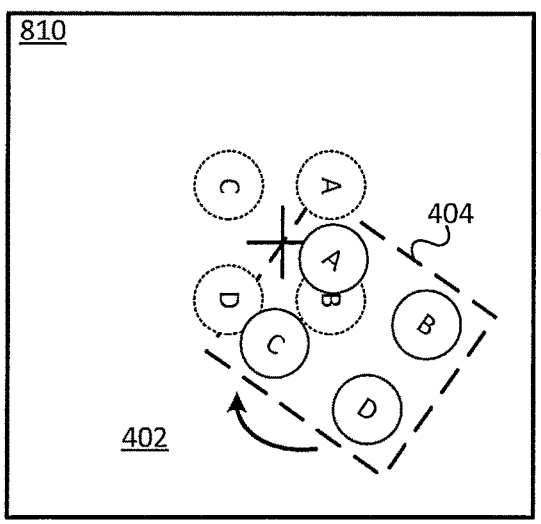
Figure 8:
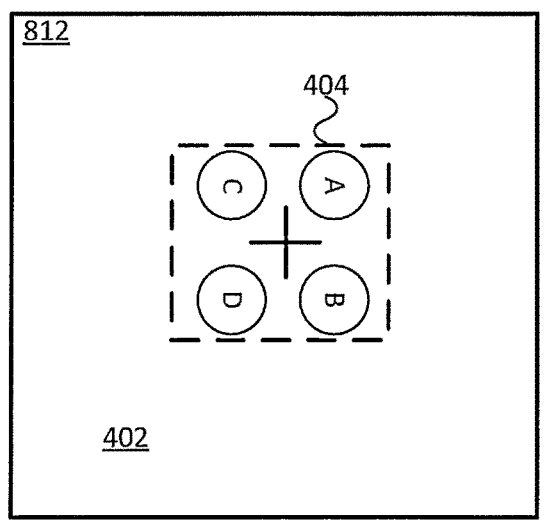

As another example, referring to diagram 804 shown in FIG. 8, the positioning device 404 may have located at a magnet disposed on the UAV 110, depicted as solid-line A. As shown in diagrams 806 and 808 of FIG. 8, once the positioning device 404 has located one magnet disposed on the UAV 110, the positioning device 404 may be operated to locate the other magnets of the UAV 110, which may correspond to legs of the landing gear 128 and depicted as solid-lines BCD. It is noted that the positioning device 404 may be configured to have translational and rotational motion to locate and move the UAV 110.

At block 308 of process 300, the logic device may operate the positioning device 404 to move the UAV 110 to a location and/or orientation on the surface 404 of the landing platform 131. For example, the positioning device 404 may move the UAV 110 from the initial landing location on the surface 404 shown in FIG. 6 to the target location shown in FIG. 7. As another example, and in reference to diagrams 808-812 of FIG. 8, the positioning device 404 may move the UAV 110 from an initial landing location on the surface 404 to the target location and orientation, which is depicted as the solid-line ABCD pattern for the UAV 110 aligning with the dashed-line ABCD pattern for the target location and orientation.

According to various embodiments, once the UAV 110 has been moved to the target location and/or orientation, the logic device may operate one or more other electromechanical systems associated with the landing platform 131 to perform actions. For example, the logic device may dock (e.g., connect by wire or wirelessly) the UAV 110 for battery charging or replacement and/or data exchange and processing. As another example, the logic device may cause a pick-up or loading of cargo. As another example, the logic device may cause the UAV 110 to be moved and/or packaged for storage or safely secured to the landing platform 131. In cases where the UAV 110 is moved and/or packaged for storage, moving the UAV 110 to a correct location and orientation may be required, such as to prevent damage to the UAV 110 for example.

Figure 9A:
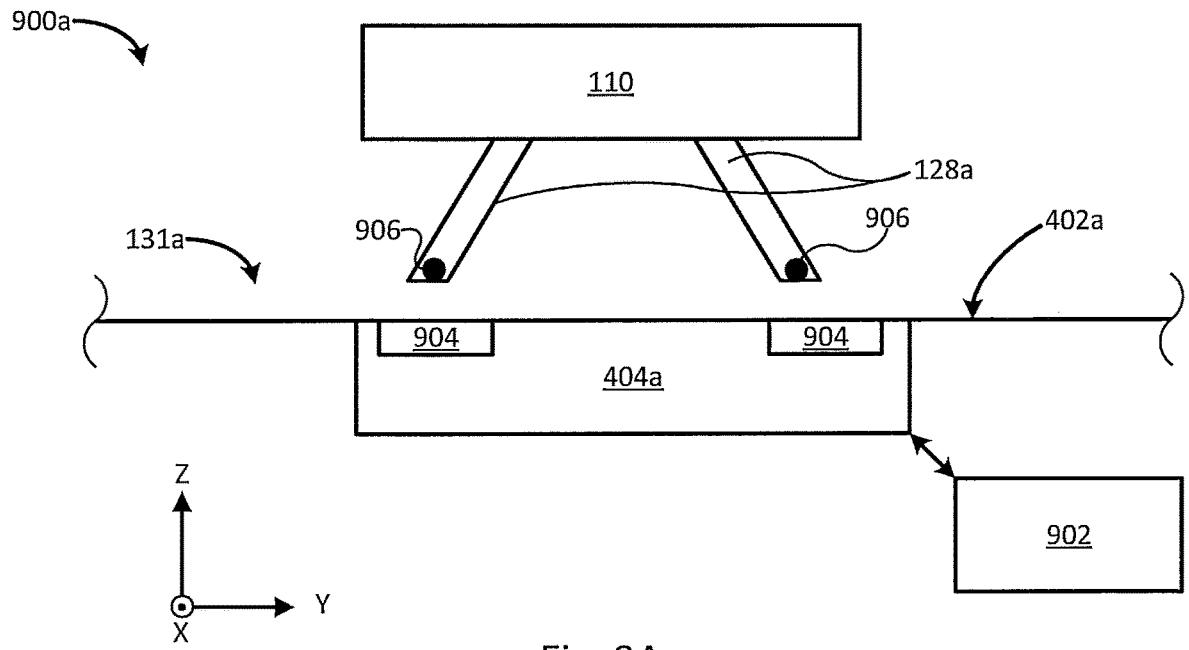
FIGS. 9A and 9B illustrate example implementations of landing platforms and UAVs in accordance with one or more embodiments of the present disclosure.
Figure 9B:
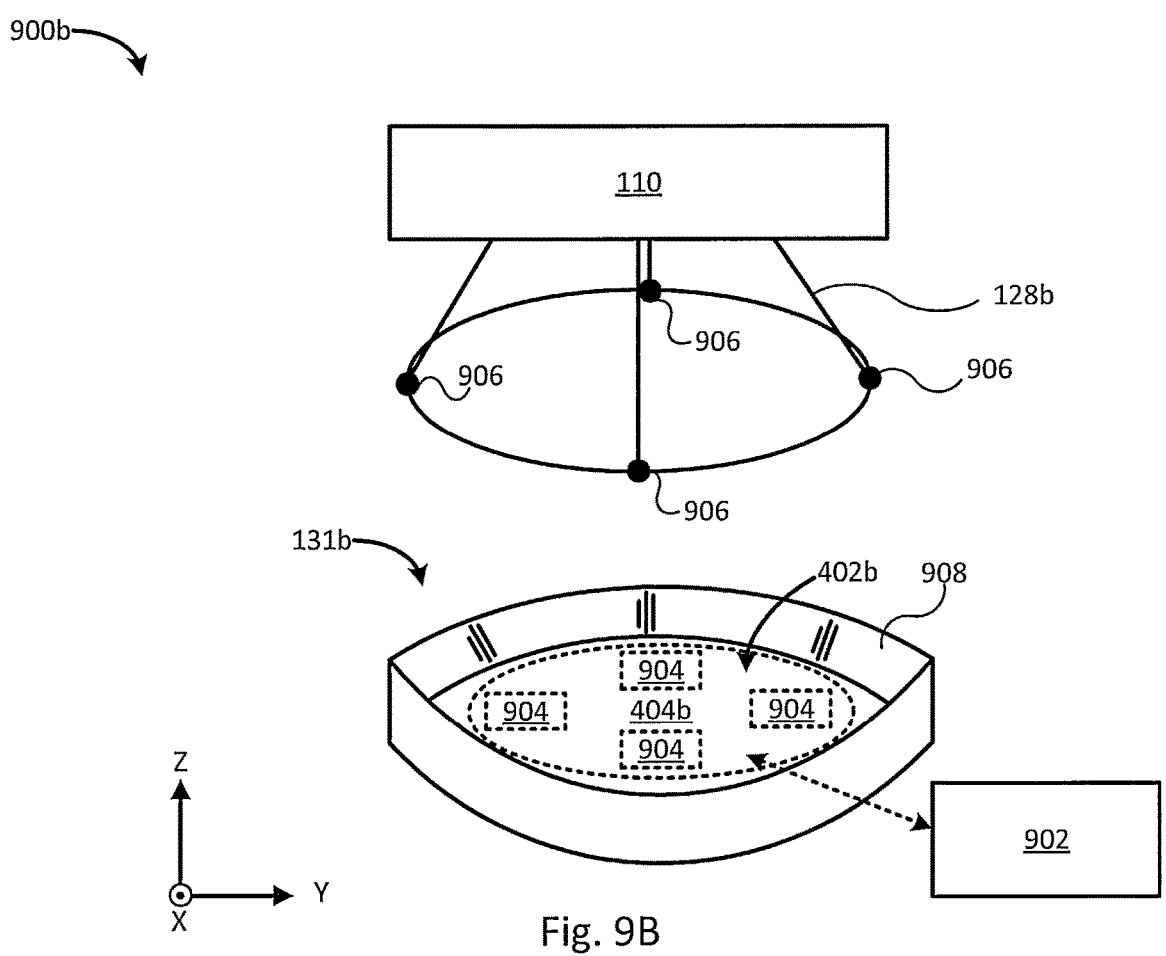

Referring now to FIGS. 9A and 9B, illustrated are example implementations of a landing platform and a UAV (e.g., similar to landing platform 404 and UAV 110) in accordance with various embodiments of the present disclosure. In example 900a, a landing platform 131a may include positioning device 404a disposed under the surface 402a of the landing platform 131a, where the surface 402a has a flat configuration suitable to receive the UAV 110. A logic device 902 may be communicatively coupled to the positioning device 404a to operate the positioning device 404a as generally described herein. In some embodiments, the logic device 902 may be the logic device 112 of the UAV 110, the logic device 138 of the base station 130, and/or a logic device of the positioning device 404a, which may be communicatively coupled to the logic device 112 and/or the logic device 138.

The positioning device 404a may further include components 904. In some embodiments, the components 904 may be magnets, such as permanent magnets or temporary magnets. In some cases, the components 904 may be implemented as electromagnets, which may be a type of magnet in which a magnetic field is produced by selectively passing an electric current through a wire wound into a coil. Further, when the components 904 are implemented as electromagnets, the logic device 902 may selectively activate the electromagnets for certain operations in process 300 of FIG. 3, such as when locating the UAV 110 and moving the UAV 110. The logic device 902 may deactivate the electromagnets when they are not needed or to control the electromagnets to fixedly secure the UAV 110 to the landing platform 131. In some embodiments, the components 904 of the positioning device 404a may include a metal substance configured to interact with components 906 disposed on the landing gear 128a of the UAV 110. For example, the components 906 of the UAV 110 may be implemented as permanent magnets or temporary magnets, including electromagnets, which may be selectively activated by the UAV 110 or the positioning device 404a to interact with the components 904 of the positioning device 404a. In other embodiments, the components 906 may be implemented to include a metal substance that is configured to interact with the components 904 of the positioning device 404.

According to one embodiment, the positioning device 404a may be configured to move away (e.g., in a negative-Z direction depicted in example 900a) from the underside of the surface 402a to reduce a magnetic force on the UAV 110 (e.g., the landing gear 128a). For example, in embodiments where components 904 are implemented as permanent magnets and components 906 are implemented to include a metal substance, the positioning device 404a may be moved away from the underside of the surface 402a so that the UAV 110 may take-off or otherwise move about the landing platform 131a without or with minimal interference.

Example 900b may be similar to example 900a. However, in example 900b, the surface 402b of the landing platform 131b may be implemented to have a raised perimeter 908 adjacent to the surface 402b, which may be configured to guide landing gear 128b of the UAV 110, and thus the UAV 110, to a target location on the surface 402b. For example, the landing gear 128b may have a ring configuration or other configuration that complements the raised perimeter 908 of the surface 402b such that the UAV 110 passively sinks into the target location on the surface 402b through gravity. For example, the raised perimeter 908 may be substantially conical to guide the UAV 110 to a centered target location on the surface 402b. In such cases, the UAV 110 lands in the target location and the positioning device 404b may rotate the UAV 110 about the surface 402b to arrive at the target orientation.

In some embodiments, the logic device 902 may determine an orientation of the UAV 110 so that the positioning device 404b can correctly rotate the UAV 110 to the target orientation. In various embodiments, the components 904 may be synced with the components 906 such that the logic device 902 will know the orientation of the UAV 110 when each component 906 of the UAV 110 is located using the components 904 of the positioning device 404b. In some cases, each component 906 may have a passive or active identifier that may be used to identify the orientation of the UAV 110. In other embodiments, the UAV 110 may determine an orientation for itself (e.g., using orientation sensor 114), which may be passed to the logic device 902 so that the logic device 902 knows how to rotate the UAV 110 to the correct target orientation.

Figure 10:
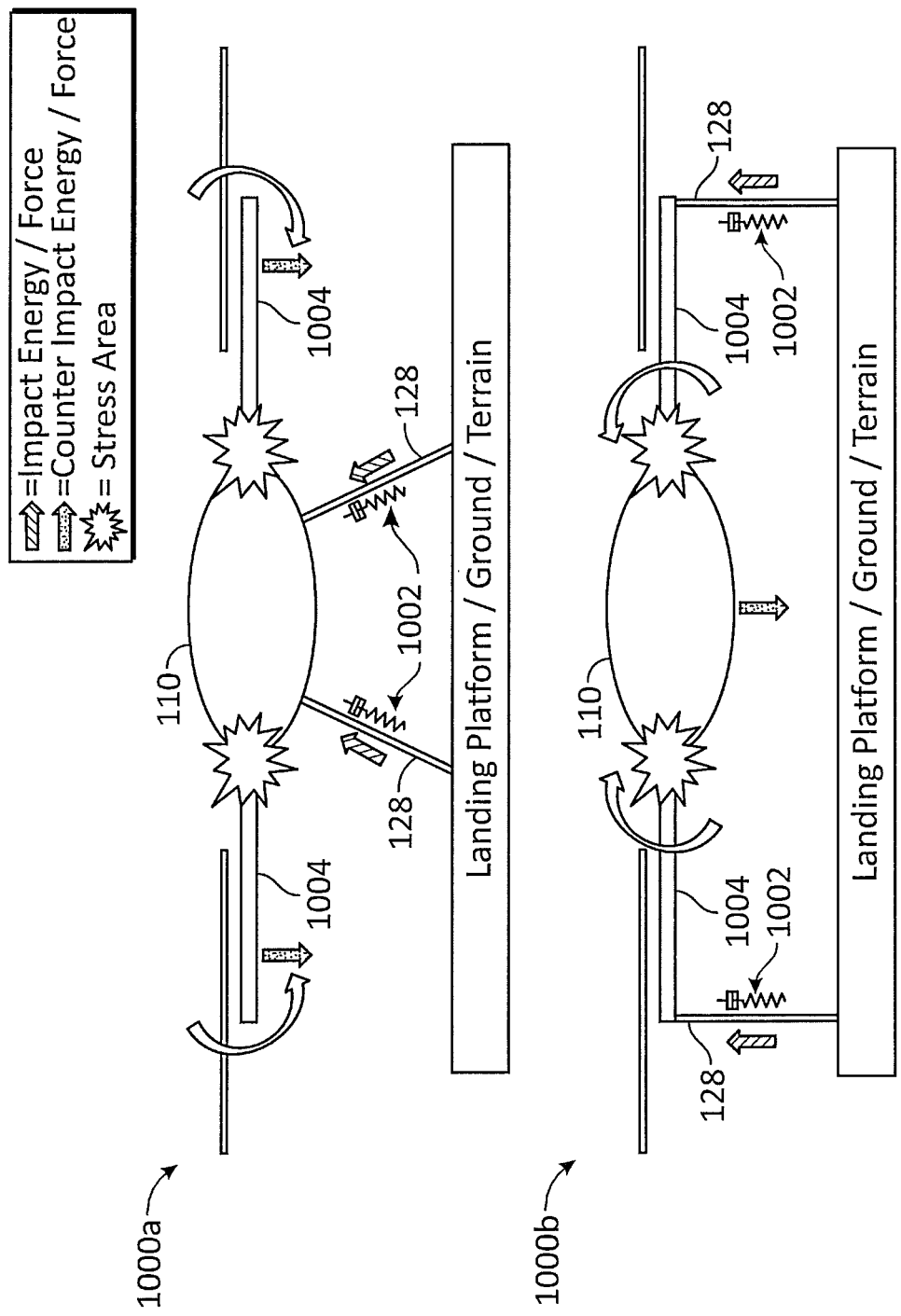
FIG. 10 illustrates example implementations of a UAV in accordance with one or more embodiments of the present disclosure.

Referring now to FIG. 10, illustrated are example implementations of the UAV 110 in accordance with various embodiments of the present disclosure. During landing of the UAV 110, areas that are joined and/or furthest away from a center of gravity of the UAV 110 typically exhibit most of the stresses of landing and are more prone to extensive deflection/stresses, fractures, and/or failures due to increased and/or concentrated stresses. Typically, when a UAV system's overall size and mass increases, so do landing stresses. To reduce stresses during landing, a shock absorption system 1002 may be implemented to reduce overall impact energy/force(s) on areas that are more prone to higher deflection/stresses (e.g., stress areas). In example 1000a, the UAV 110 may include shock absorption system 1002 implemented on each leg of the landing gear 128 that extends from a body of the UAV 110. More or less legs of the landing gear 128 may be implemented according to various configurations. In example 1000b, the UAV 110 may include shock absorption system 1002 implemented on landing gear 128 located at the ends of propulsion system extension arms 1004.

Figure 11:
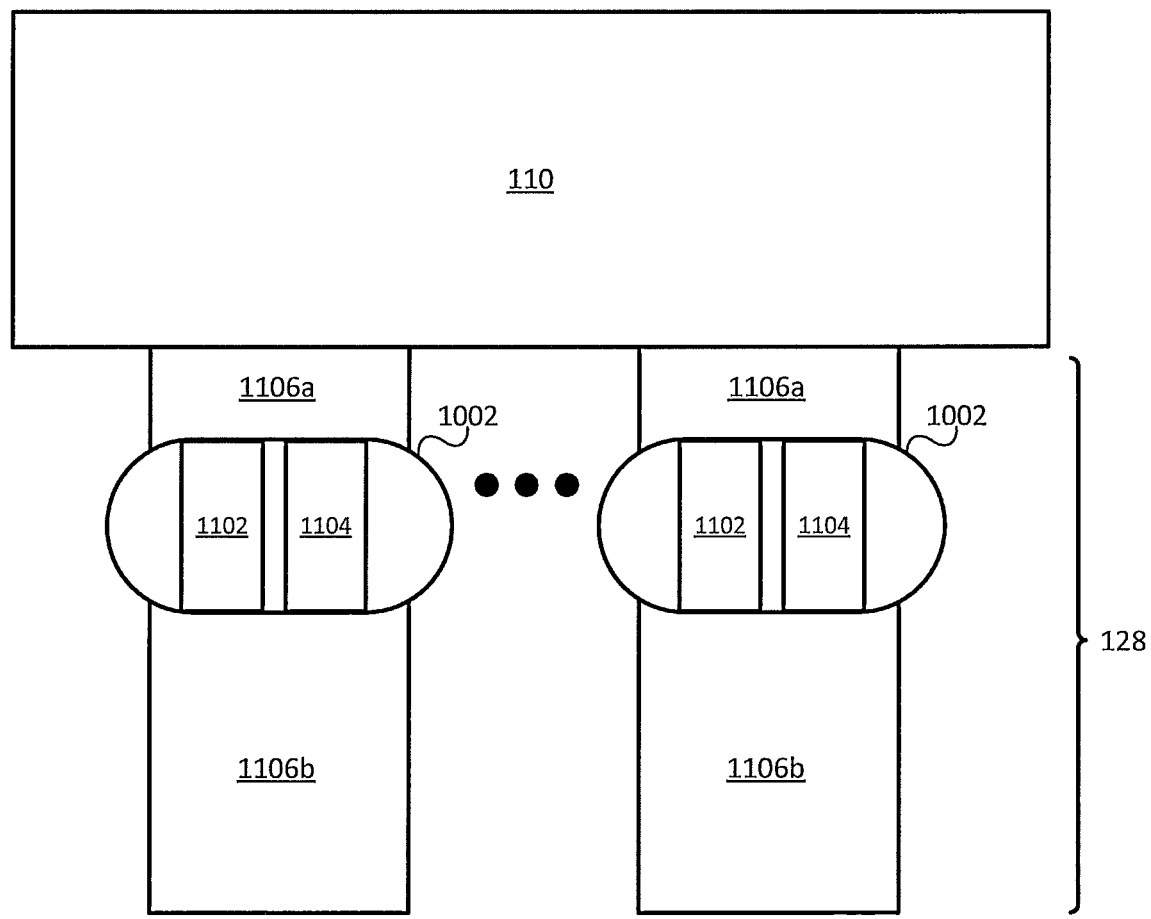
FIG. 11 illustrates an example implementation of a UAV in accordance with one or more embodiments of the present disclosure.

In some embodiments, the shock absorption system 1002 may be operated to reduce force received at stress areas of the UAV 110 when the landing platform 131 receives the UAV 110 during landing. For example, referring now to FIG. 11, the shock absorption system 1002 may include a spring 1102 or other elastic and/or other visco-elastic material configured to reduce the impact force at landing. In some embodiments, the spring 1102 may connect two portions of a leg of the landing gear 128 (e.g., portion 1106a and 1106b), where the two portions of the leg may telescope (e.g., one leg barrel is insertable into the second leg barrel) and be biased relative to each other by the spring or other elastic and/or other visco-elastic material.

The shock absorption system 1002 may further include a shock absorber 1104 configured to dampen movement by the UAV 110 at landing, such as vibrations caused by the spring 1102. The shock absorber 1104 may be implemented with gas, liquid, or other material(s) with rebounding characteristics. In some embodiments, the shock absorber 1104 may be a magnetorheological shock absorber, which may be filled with magnetorheological fluid that can be controlled by a magnetic field produced by an electromagnet. In some embodiments, the UAV 110 may be configured to continuously control the damping characteristics of the magnetorheological shock absorber during landing by varying the power of the electromagnet, which may cause a fluid viscosity in the magnetorheological shock absorber to increase or decrease based on the electromagnet intensity. In some embodiments, the positioning device 404 of the landing platform 131 may be configured to attract the magnetorheological shock absorber to locate and/or move the UAV 110 as described herein.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving an unmanned aerial vehicle (UAV) on a surface of a landing platform;
   operating a positioning device disposed under the surface of the landing platform to locate the UAV; and
   operating the positioning device disposed under the surface of the landing platform to move the UAV to a location and/or an orientation on the surface;
   wherein the operating the positioning device to move the UAV comprises:
      using a first magnet to attract the UAV; and
      moving the first magnet below the surface to slide the UAV above the surface to the location and/or the orientation.

2. The method of claim 1, wherein the first magnet is an electromagnet.

3. The method of claim 1, wherein the operating the positioning device to locate the UAV comprises detecting an interaction between a Hall effect sensor and a second magnet.

4. The method of claim 3, wherein the Hall effect sensor is provided by the positioning device and the second magnet is provided by landing gear of the UAV.

5. The method of claim 1, wherein the operating the positioning device to move the UAV comprises translating the UAV to the location on the surface and/or rotating the UAV to the orientation on the surface to secure the UAV at the location and the orientation.

6. The method of claim 1, wherein the landing platform comprises a raised perimeter adjacent to the surface and configured to guide landing gear of the UAV to the location on the surface.

7. The method of claim 1, wherein the UAV comprises landing gear having a plurality of legs, and wherein each leg comprises a shock absorption system, the method further comprising:
   operating the shock absorption system during the receiving to reduce force received at stress areas of the UAV; and
   operating the shock absorption system after the receiving to dampen movement by the UAV after the receiving.

8. The method of claim 7, wherein each shock absorption system of each leg comprises a spring and/or a visco-elastic material configured to reduce the force and a shock absorber configured to dampen the movement, and wherein the spring and/or the visco-elastic material is configured to bias two portions of the leg relative to each other.

9. The method of claim 7, wherein the shock absorption system of each leg comprises a magnetorheological shock absorber, and wherein the positioning device is configured to attract the magnetorheological shock absorber to locate and/or to move the UAV.

10. The method of claim 1, wherein the positioning device is operated by the UAV.

11. A system comprising:
    a landing platform having a surface and a positioning device disposed under the surface and communicatively coupled to a logic device, wherein the logic device is configured to:
       receive an unmanned aerial vehicle (UAV) on the surface of the landing platform;
       operate the positioning device to locate the UAV; and
       operate the positioning device to move the UAV to a location and/or orientation on the surface;
    wherein the positioning device comprises a first magnet, and wherein the operating the positioning device to move the UAV comprises:
       activating the first magnet to attract the UAV; and
       moving the first magnet below the surface to slide the UAV above the surface to the location and/or the orientation.

12. The system of claim 11, wherein the first magnet is an electromagnet.

13. The system of claim 11, wherein the operating the positioning device to locate the UAV comprises detecting an interaction between a Hall effect sensor and a second magnet.

14. The system of claim 13, wherein the Hall effect sensor is provided by the positioning device and the second magnet is provided by landing gear of the UAV.

15. The system of claim 11, wherein the operating the positioning device to move the UAV comprises translating the UAV to the location on the surface and/or rotating the UAV to the orientation on the surface to secure the UAV at the location and the orientation.

16. The system of claim 11, wherein the landing platform comprises a raised perimeter adjacent to the surface and configured to guide landing gear of the UAV to the location on the surface.

17. The system of claim 11, further comprising the UAV, wherein the UAV comprises landing gear having a plurality of legs, wherein each leg comprises a shock absorption system, and wherein the UAV is configured to:
    operate the shock absorption system during the receiving to reduce force received at stress areas of the UAV; and
    operate the shock absorption system after the receiving to dampen movement by the UAV after the receiving.

18. The system of claim 17, wherein each shock absorption system of each leg comprises a spring and/or a visco-elastic material configured to reduce the force and a shock absorber configured to dampen the movement, and wherein the spring and/or the visco-elastic material is configured to bias two portions of the leg relative to each other.

19. The system of claim 17, wherein the shock absorption system of each leg comprises a magnetorheological shock absorber, and wherein the positioning device is configured to attract the magnetorheological shock absorber to locate and/or to move the UAV.

20. The system of claim 17, wherein the logic device is disposed on the UAV.

* * * * *